United States Patent [19]
Remerowski et al.

[11] Patent Number: 5,938,386
[45] Date of Patent: Aug. 17, 1999

[54] FASTENING DEVICE

[75] Inventors: David L. Remerowski; Duane C. Shomler; Anthony T. Racca; David J. Lococo, all of Cincinnati, Ohio

[73] Assignee: Senco Products, Inc., Cincinnati, Ohio

[21] Appl. No.: 09/072,301

[22] Filed: May 4, 1998

Related U.S. Application Data

[63] Continuation-in-part of application No. 08/642,826, May 3, 1996, abandoned.

[51] Int. Cl.$^6$ .......................................................... E04B 1/48
[52] U.S. Cl. .............................. 411/82; 411/901; 411/930; 411/909; 29/281.5; 156/66; 156/275.7; 156/293; 156/307.7; 156/309.6
[58] Field of Search .................................. 156/62.2, 62.8, 156/66, 272.2, 275.7, 293, 307.7, 309.6, 320; 411/82, 258, 930, 901, 909; 405/259.5; 264/112, 113; 29/281.5

[56] References Cited

U.S. PATENT DOCUMENTS

| | | |
|---|---|---|
| 4,687,397 | 8/1987 | Berecz . |
| 4,718,801 | 1/1988 | Berecz . |
| 5,137,668 | 8/1992 | Lamb, Sr. . |
| 5,145,626 | 9/1992 | Bastioli et al. . |

*Primary Examiner*—Michael W. Ball
*Assistant Examiner*—Sam Chuan Yao
*Attorney, Agent, or Firm*—Jerrold J. Litzinger

[57] ABSTRACT

A fastening device, which will facilitate the assembly of associated parts or manufactured articles, features a conductive target material for absorbing electromagnetic waves and converting wave energy to heat; an assembly element, contiguous with the target material, which expands upon exposure to heat emanating from the target material; and a solid adhesive material, contiguous with the conductive target material, which will become adhesively active and effect the adherence of the associated parts upon exposure to heat emanating from the target material.

8 Claims, 4 Drawing Sheets

FASTENING DEVICE

CROSS REFERENCE TO A RELATED APPLICATION

This application is a continuation-in-part of U.S. patent application Ser. No. 08/642,826 filed on May 3, 1996 now abandoned.

BACKGROUND OF THE INVENTION

The disclosed invention relates to a fastening device which is useful in facilitating the assembly of associated parts by employing a heat activated assembly element such as a dowel or a disc or a strip constructed to include a target material and a solid substance which will exhibit adhesive and expansive properties on exposure to heat. The heat will be generated in the target material by exposing the target material to electromagnetic waves.

DESCRIPTION OF THE PRIOR ART

U.S. Pat. No. 4,038,120 to Russell describes the use of an energized heating element or wire to heat a hot melt glue resulting in adhesion between contiguously assembled panels. The reference method involves heating a glue-coated wire to liquefy the glue, producing a cohesive state and facilitating the assembly of panels. This method is useful for introducing a cohesive material (glue) to an area of limited accessibility (groove), but the heating element (wire) requires the direct application of energy (electricity) to provide the heat to melt the glue.

U.S. Pat. No. 3,996,402 to Sindt relates to the assembly of sheet materials by the use of a fastening device utilizing an apertured sheet of eddy current-conducting material sandwiched between coatings of hot-melt glue. An induction heating system is activated causing eddy current heating in the EC-conducting material with consequent melting of the hot-melt glue thus resulting in fusion and bonding of the sheet materials in accordance with the desired construction.

U.S. Pat. No. 3,574,031 to Heller et al. describes a method and material for welding thermoplastic bodies by using a susceptor sealant between the bodies to be joined. The susceptor sealant is characterized by having particles, heatable by induction, dielectric or radiant energy, dispersed in a thermoplastic carrier compatible with the thermoplastic sheets to be welded. The welding of the thermoplastic sheets is effected by applying and exposing the susceptor sealant to heat energy, softening the carrier material and joining all thermoplastic materials.

U.S. Pat. No. 3,61 2,803 to Klaas discloses a fastening device, which, in its most relevant embodiment, consists of a quantity of heat-activatable adhesive containing a closed electronically conductive loop and a ferromagnetic material insulated from said closed loop. In operation, the fastening device is activated by a solenoid coil energized with alternating electrical current. The current emitted from the solenoid is transferred to the fastening device where a current of large amperage and low voltage is generated in the loop enveloped by the heat-activatable adhesive. The current produces heat that causes the adhesive to become sticky. The efficiency, and apparently the usefulness, of the disclosed device is improved by fitting it with a ferromagnetic core enclosed within the closed loop.

SUMMARY OF THE INVENTION

The instantly disclosed fastening device is distinguished from, and goes beyond, the prior art by describing an assembly element which will provide structure, strength and stability to an assembled product while serving as a vehicle for introducing an adhesive material in a neat, non-messy form to internal and inaccessible areas of the parts to be assembled. In addition to providing adhesive properties, the disclosed device simultaneously expands upon exposure to heat; this expansion takes up assembly clearances and provides contact pressure at the interface between the adherents and the device. The disclosed device includes a target material for absorbing and converting electromagnetic waves to heat, and for conducting heat energy to both the expansive assembly element and the adhesive material so that it can be activated to provide an adhesive bond between the associated parts. This disclosure also relates to an improved and expeditious method for the assembly and adherence of associated parts of various materials which are mostly transparent to electromagnetic waves. The improved method utilizes a device which comprises an assembly element which includes a conductive target material for absorbing electromagnetic waves, a solid adhesive material contiguous with the conductive target material which will become physically or chemically adhesive by heat energy resulting from electromagnetic waves absorbed and conducted by the target material, and an expansive material which expands concurrently with the heat from the target material. This disclosure also relates to the assembled products produced according to the method utilizing the disclosed fastening device.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENTS

Reference will now be made in detail to the present preferred embodiments of the invention, examples of which are illustrated in the accompanying drawings, wherein like numerals indicate the same elements throughout the views.

Figure 1:
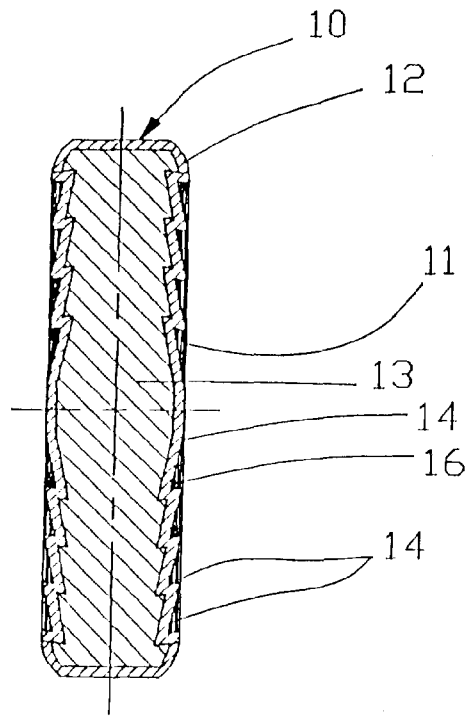
FIG. 1 is a sectional view of the fastening device fashioned into the shape of a dowel.
Figure 2:
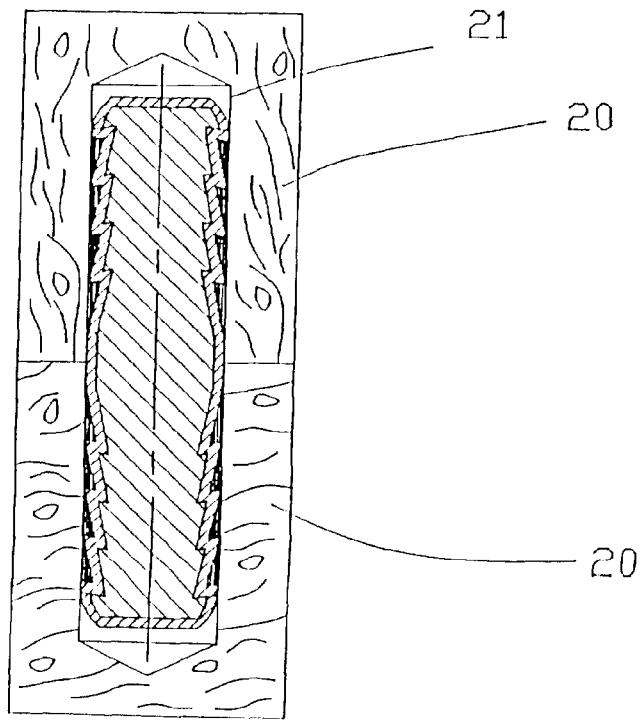
FIG. 2 is a sectional view of the fastening device in the form of a dowel situated and "hidden" within associated parts.
Figure 3:
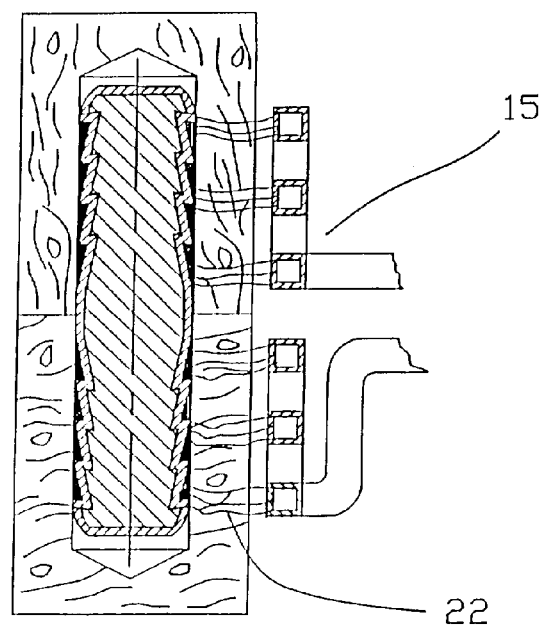
FIG. 3 is a sectional view of the fastening device situated as in FIG. 2 and being adhesively activated by electromagnetic waves emanating from a generator.
Figures 4, 4A:
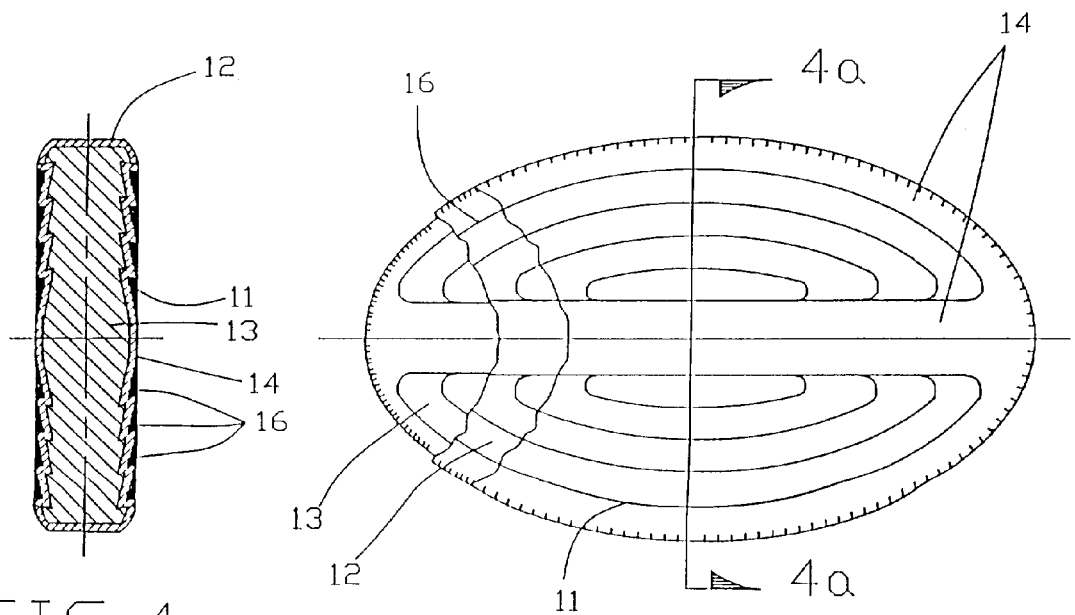
FIG. 4 is a partial sectional plan view of the fastening device in the shape of a disc depicting repositories of adhesive material.
FIG. 4a is a sectional view of the fastening device in the shape of a disk, taken along section line a:a of FIG. 4.

The disclosed device 10, shown in FIG. 1, features an expansive assembly element 13, a target material 12, and coated with a solid adhesive material 11. As illustrated in FIG. 2, device 10 is designed to be placed, in a generally hidden relationship, between or within associated parts 20 to be adhesively joined. When desirably situated, such as in holes 21 drilled to accommodate a dowel or in grooves cut to accommodate a disc, the device can be exposed to electromagnetic waves 22, generally emanating from a generator 15 by passing the wand of the generator in the general area of the "hidden" device, as shown in FIG. 3. The preferred range for electromagnetic wave frequency is from approximately 100 Hertz (100 Hz) to approximately 10 Megahertz (10 Mhz). The electromagnetic waves will penetrate the aligned associated parts 20, to be adhesively joined, said parts being substantially transparent to electromagnetic waves. The target material must be fashioned from substances which are not transparent to electromagnetic waves, that will absorb the electromagnetic waves, and create heat which will be conducted to both the solid adhesive-material and the expansive assembly element. To elaborate, heat is produced in the conductive target material by two mechanisms: eddy current resistive heating and magnetic hysteresis. Eddy current resistive heating applies to all conductive materials and is produced in the target material by the electromagnetic waves emanating from the generator (sometimes called the induction coil). The generator is energized by a traditional source of alternating current. The heat from magnetic hysteresis is observed only in magnetic materials. As the electromagnetic field produced by the generator reverses polarity, the magnetic atoms in the target material also reverse. There is an energy loss in this reversal which is analogous to friction; this energy loss is magnetic hysteresis. The "lost" energy is immediately converted to heat and conducted by the target material to both the heat-activatable adhesive material to initiate adhesion and to the expansive assembly element to initiate expansion. When heated to the necessary temperature, the adhesive material will liquefy or become heat-activated, attach itself to the adjacent associated parts, and, on cooling, create an adhesive relationship between the associated parts.

Two adhesion mechanisms, hot-melt and heat-activated cure, are proposed for use with the disclosed device. Both mechanisms are initiated by heat emanating from the conductive target material. Hot-melt adhesives are solid at ambient temperatures, but melt or liquefy when the temperature is elevated by heat flowing from the conductive target material. The melted adhesive wets the adherents and, in the case of porous, foraminous, or fibrous adherents, penetrates the surface of the parts to be bonded. As the adhesive cools, the adherents and adhesive are bonded by the electrostatic attraction of polar molecular groups. In the case of porous, foraminous, or fibrous adherents, mechanical interlocking can contribute to bond strength.

Note that for the hot-melt mechanism, the bonding is reversible. Thus, by repeating the induction heating procedure, the bond can be undone and the adherents separated. The ability to reverse the adhesion and separate assembled parts is not a trivial attribute. In addition to the advantage of being able to re-assemble or repair misaligned parts, it is also desirable to be able to disassemble manufactured articles to facilitate serviceability and repair. Often, when working with associated parts of different materials, it will be beneficial to disassociate assembled parts to facilitate recycling. Heat-activated curing adhesives are also solid and easy to manipulate at ambient temperatures, but when the adhesive temperature is elevated by the heat from the conductive target material, a chemical reaction is initiated. This reaction involves a cure or crosslinked bonding either within the adhesive or between the adhesive and the adherents. Such bonds are typically irreversible. Frequently, a heat-activated curing adhesive bond will demonstrate an electrostatic attraction between the adhesive and the adherents and a crosslinked bond within itself.

In one form of a typical embodiment of the disclosed fastening device 10, the adhesive coated target material can comprise or be affixed to, or incorporated into, an expansive assembly element 1 3, such as a dowel, a strip, or a disc. In one preferred embodiment as shown in FIG. 1, the assembly device is formed, molded, compressed or machined into a dowel having an annular dam 14 or fitted diameter for containing or localizing the adhesive after it has liquefied and positioning barbs 16 to help the dowel remain in the desired alignment. The dowel is then wrapped, coated, surrounded, embedded or integrated with a metallic target material 12 fashioned from a readily available metal such as steel or aluminum. The solid adhesive material is attached to the foil by a liquid coating or physical self-attachment in the form of a film, encapsulants, granules or powder. The fully fabricated device is then inserted in pre-drilled holes 21, aligned between associated parts 20 to be joined and the joined parts are then exposed to electromagnetic waves 22 from an electromagnetic wave generator 15 as shown in FIG. 3. The waves must penetrate the parts to be joined but all materials, to some extent, are transparent to electromagnetic waves. Materials that are not as transparent, such as those containing significant amounts of metal, will simply require a longer or more intensive exposure to the electromagnetic wave generator and the emanating waves. Then, the target material absorbs the emanating waves, converts the waves to heat energy, and conducts the heat energy to both the adhesive coating and the expansive assembly element.

The expansive assembly element 13 is to be fabricated from a variety of materials which exhibit suitable compressibility and mixed with a heat activated binder material. Suitable compressible materials will be either fibrous, foraminous, or rubber-like in nature and have suitable temperature resistance to allow activation of the binder material. Suitable fibrous materials include fiberglass, ceramic fibers, graphite fibers, metal wools, plant fibers, animal bristles, and mixtures of the preceding. Suitable foraminous materials include sponges, crushed nut shells, hollow plastic spheres, and synthetic foam products. Binder materials will be either hot melt adhesives or heat curing adhesives.

Figure 5:
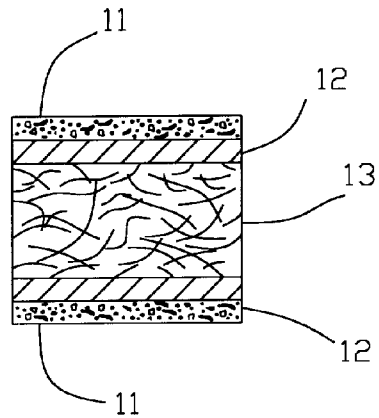
FIG. 5 is a sectional view of the fastening device which illustrates the orientation of fibrous material in the condition prior to application of heat and pressure.
Figure 6:
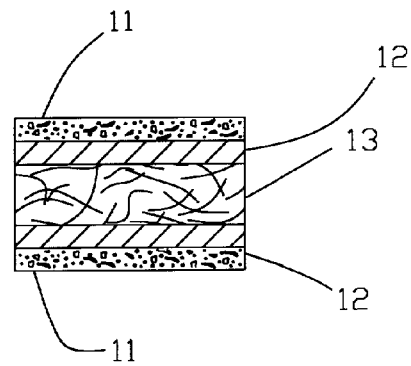
FIG. 6 is a sectional view of the fastening device which illustrates the orientation of fibrous material after application of heat and pressure and subsequent cooling.
Figure 7:
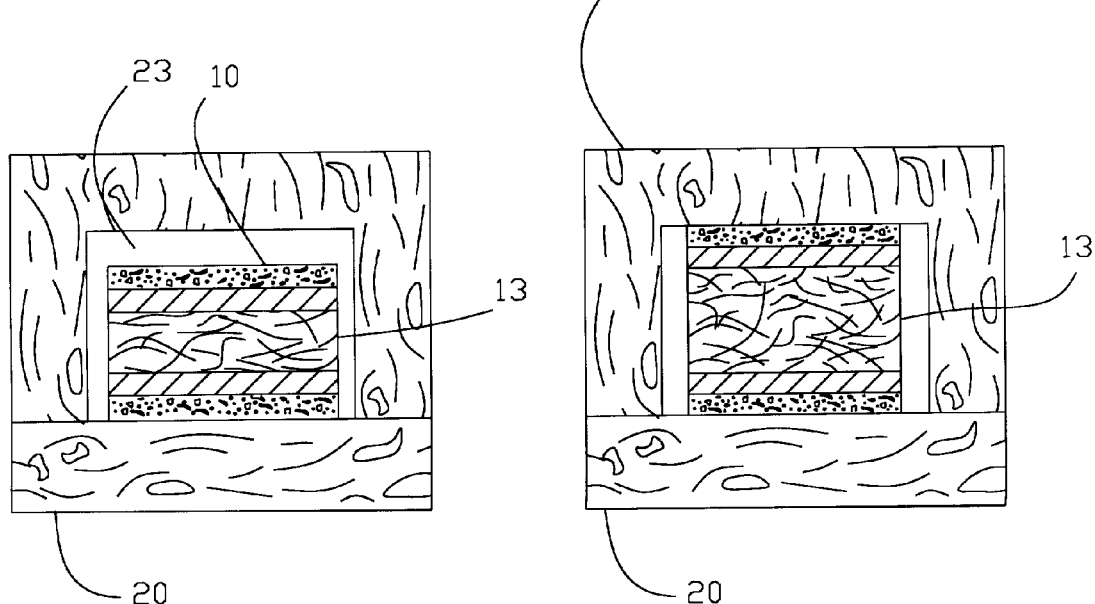
FIG. 7 is a sectional view of the fastening device of FIG. 6 assembled within an article before activation by electromagnetic waves.
Figure 8:
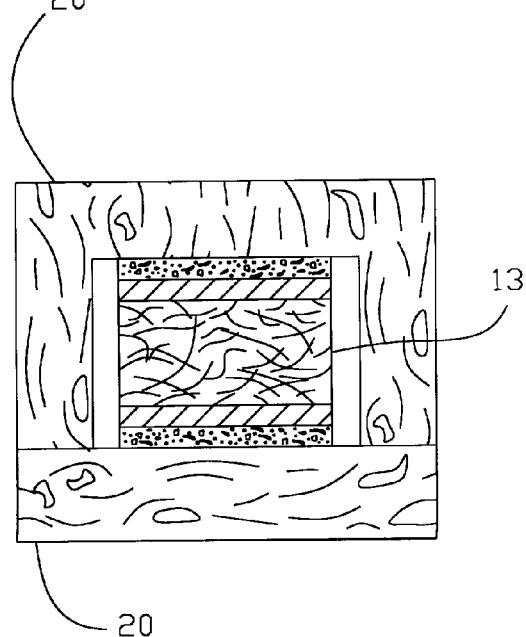
FIG. 8 is a sectional view of the fastening device assembled within an article after activation by electromagnetic waves.

The operation of the fastening device is illustrated in FIG. 5 thru FIG. 8. Note that for presentation purposes, the expansive assembly element 13 is shown to be a fibrous material, although the operation of the device would be the same for other materials. In FIG. 5, the fastening device 10 is shown before compression of the expansive assembly element 13. The fastening device 10 after compression of the expansive assembly element 13 is shown in FIG. 6. The compression is achieved by applying heat and pressure to the expansive element 13 until the adhesive binder material within element 13 is activated then cooling sufficient to harden the binder material in order to fix the element in the compressed state. The fastening device 10 is placed within associated parts 20 to be adhesively joined in FIG. 7. Note that in order to assure that the mating line 24 of the assembly is minimized, a clearance 23 is provided. Upon exposure to electromagnetic waves, the target element 12, which is a metallic piece such as steel, absorbs same and converts the energy to heat which is conducted to both the adhesive 11 and the expansive assembly element 13. Concurrently, the adhesive is activated and the element expands. The expansion of the fastening device takes up the assembly clearance 23 and transports the adhesive to the adherent surface. The resultant pressure from the expansion of the device is beneficial both in the adhesive bonding and in increasing the bond strength by friction.

Figures 9, 10:
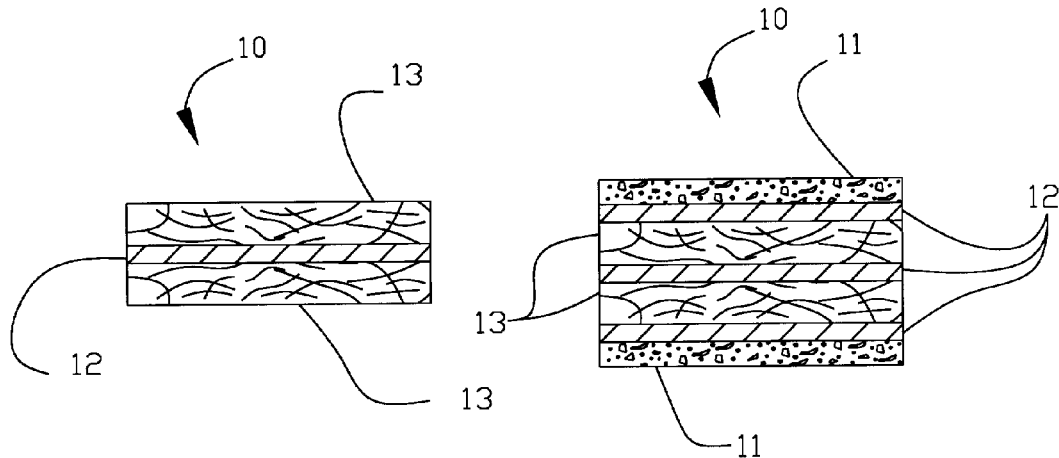
FIG. 9 is an alternative embodiment of the fastening device.
FIG. 10 is an alternative embodiment of the fastening device.
Figure 11:
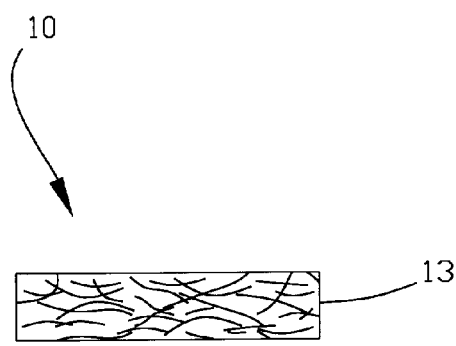
FIG. 11 is an alternative embodiment of the fastening device.
Figure 12:
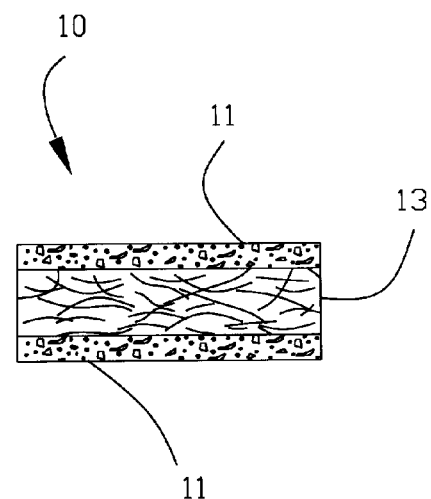
FIG. 12 is an alternative embodiment of the fastening device.

Alternative embodiments of the fastening device are illustrated in FIG. 9, FIG.10, FIG.11, and FIG.12. In FIG.9, the fastening device 10 consists of a target material 12 surrounded by an expansive assembly element 13 on both sides. In FIG. 10, the fastening device 10 is shownlayers 12 which co material layers 12 which could reduce the time needed to heat the adjacent expansive assembly elements 13 sandwiched between them. In certain applications, this configuration could be extended to an indefinite number of target material layers. An expansive assembly element which incorporates the target element function is shown in FIG.11. Here, the target material 12 would be either metallic fibers, particles, or flakes. Alternative target materials would include conductive or magnetic ceramics and semiconductive materials such as graphite and silicon, in the form of fibers, flakes or particles. The fastening device 10 could also be mixture of suitable compressible materials with suitable target materials and an adhesive binder material. In FIG. 12, the fastening device 10 consists of two adhesive layers 11 sandwiching a composite expansive assembly element 13 of FIG. 11.

In laboratory experiments with an assembly device as disclosed here, a fiberglass mat originally 0.188 inches thick was heated in an oven with a film of a polyamide hot melt adhesive on top. The oven temperature was set at 450° F., which is slightly above the melting point. Upon melting the adhesive was absorbed into the fiberglass. The hot adhesive wetted mat was removed from the oven, sandwiched between two sheets of aluminum foil and placed in a press. Pressure was applied until the adhesive was observed to be solidified. Thickness was measured to be 0.100 inches. The lamination was then heated using electromagnetic waves with a frequency of approximately 100,000 hertz (100 KHz) until expansion of the lamination was observed. The lamination continued to expand after removal of the heating source. Upon cooling the lamination thickness was measured at 0.147 inches.

Immediate needs for the disclosed fastening device have been identified in the furniture industry where neat, effective and efficient assembly methods can readily be exploited to manufacture affordable units in a fast, effective and clean manner. Furniture and cabinet manufacturing applications will involve the assembly of associated parts of wood and plastic, both of which are transparent to electromagnetic waves and receptive to adhesive bonding. Other uses for the disclosed device include the fabrication of lattice panels, the installation of trim molding and fence erection. Also envisioned is the assembly of plywood, gypsum board and combination boards to wall ceiling and floor framing materials. In the packaging industry, there is a need to facilitate the the fast and effective construction of containers made of wood, plastic, and engineered fiber base materials, which could all be readily assembled using the disclosed device. In addition to the simplest configuration of the fastening device where the assembly element is a disc, dowel or strip coated with an adhesive material, other configurations of the fastening device are also envisioned. One such configuration features a fastening device comprising an expansive assembly element providing alignment and support to assembled associated parts, a conductive target material integrated with the expansive assembly element, for absorbing electromagnetic waves and an adhesive material, contiguous with the conductive target material, becoming adhesively active by heat energy resulting from the electromagnetic waves absorbed and conducted by the target material.

While the foregoing is a complete description of the disclosed method, numerous variations and modifications may also be employed to implement the purpose of the invention. And, therefore, the elaboration provided should not be assumed to limit the scope of the invention which is intended to be defined by the appended claims.

What is claimed is:

1. A fastening device for promoting the assembly and adherence of associated pieces by exposure to electromagnetic energy, comprising:

an assembly element having an outer surface comprising a metallic target material, an inner region comprising a compressible expansive material and a first adhesive material, which is adhesively activatable by heat energy, located within said expansive material for holding said expansive material in a compressed state within said target material; and a second adhesive material, coated on the outer surface of said assembly element, which is adhesively activatable by heat energy; such that when said assembly is positioned within the associated pieces and exposed to electromagnetic energy, the target material provides heat energy to activate said adhesive materials, causing said adhesive materials to liquefy and expansive material to expand towards its uncompressed state and whereby effecting a bonded relationship between the associated pieces upon cooling of said adhesive materials.

2. The device of claim 1 wherein said expansive material is composed of a fibrous material.

3. The device of claim 2 wherein said fibrous material is selected from a group comprising fiberglass, ceramic fibers, graphite fibers, metal wools, plant fibers, and animal fibers.

4. The device of claim 1, wherein said expansive material is composed of a foraminous material.

5. The device of claim 4, wherein said foraminous material is selected from a group comprising sponges, crushed nutshells, hollow plastic spheres, ground cork, and synthetic foam.

6. The device of claim 1, wherein said adhesive materials comprise a hot melt adhesive.

7. The device of claim 1, wherein said adhesive materials comprise a heat curing adhesive.

8. The device of claim 1, wherein said target material is steel.

\* \* \* \* \*